July 30, 1957 F. D. JONAS 2,800,907
SUSPENSION FILE FOLDER
Filed Dec. 1, 1953
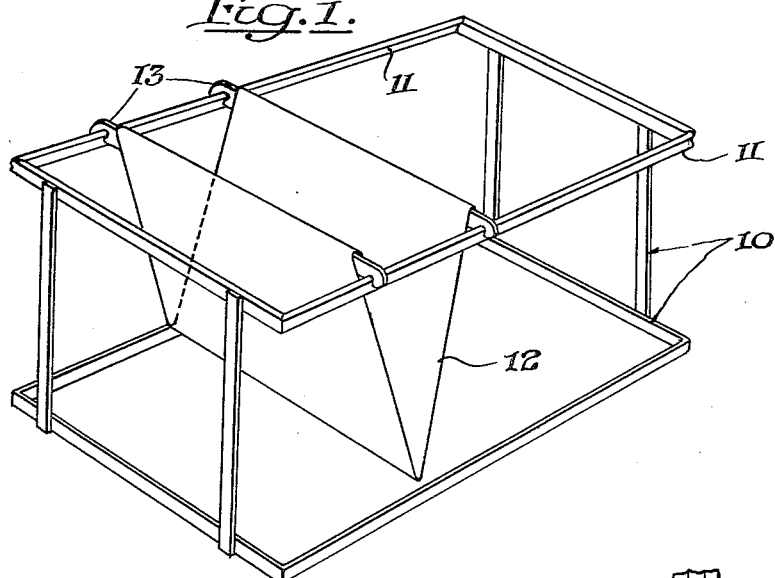
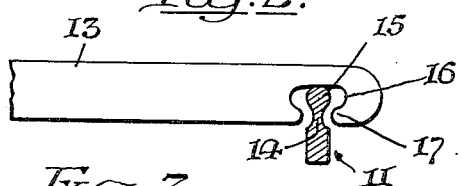
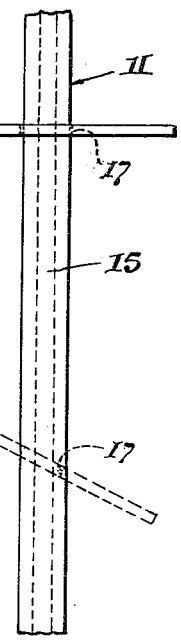
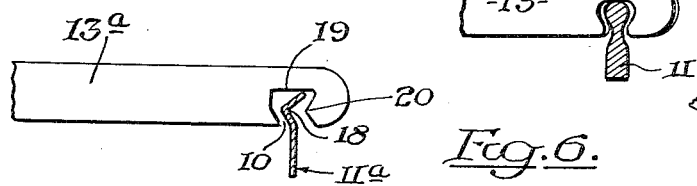
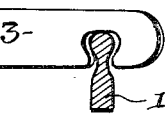
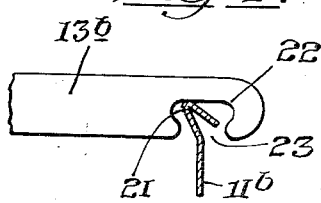
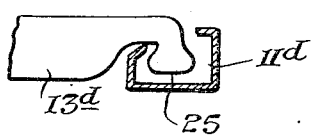
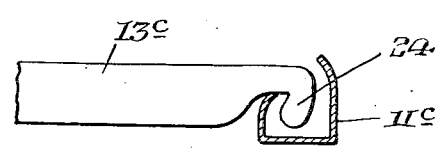
INVENTOR.
Frank D. Jonas.
BY
HIS ATTORNEYS.

United States Patent Office 2,800,907
Patented July 30, 1957

2,800,907
SUSPENSION FILE FOLDER

Frank D. Jonas, Upper Brookville, N. Y., assignor, by mesne assignments, to Oxford Filing Supply Co., Inc., Garden City, N. Y., a corporation of New York Application December 1, 1953, Serial No. 395,431

3 Claims. (Cl. 129—16)

This invention comprises improvements in suspension files with special reference to novel forms of cooperating supporting rails and folder supporting rods.

The general object of the invention is to provide a new form of cooperating supporting rails and folder supporting rods for suspension files which are of complementary construction, so as to permit ready removal of the file pockets from the supporting rails, while preventing their promiscuous displacement or ejection from the rails as a result of normal usage of such files.

More specifically, it is an object of this invention to provide supporting rods for suspension files so constructed in relation to cooperating forms of supporting rails for the files as to insure locking of the rods on the rails under all conditions except when it is desired to lift the files, including the rods which support them, from the rails.

Another object of this invention is to accomplish these improvements and novel functions by means of very simple physical structures which are inexpensive to manufacture and adapted to mass production.

Other and more detailed objects of the invention will be apparent from the following description of several embodiments thereof disclosed for illustrative purposes.

In the accompanying drawings,

Figure 1 is a perspective view of one form of support for suspension files employing the form of cooperating construction of supporting rails and rods as illustrated in detail in Figures 2, 7 and 8;

Figure 2 is a vertical, transverse, cross-sectional view through one of the supporting rails showing the cooperating structural form thereof with one of the file suspension rods;

Figures 3, 4, 5 and 6 are similar views of modified forms of the elements shown in Figure 2;

Figure 7 is a view similar to Figure 1, showing how the suspension rod is locked on the rail when it is cocked or canted as frequently occurs in the normal use of the file;

Figure 8 is a top plan view of the structure of Figures 2 and 7 showing a normal relationship of the rail and suspension rod whereby the suspension rod can be lifted from the rail without difficulty and also showing how the suspension rod looks on the rail when it is canted.

Suspension files are well known in this art and broadly involve a structure consisting of a pair of parallel rails either forming part of a drawer or cabinet file or of a framework which can be set therein, a folded fibrous pocket to receive the material to be filed, and a pair of suspension rods attached to the free edges of the front and back walls of the pocket and having ends which project at each side of the pocket so as to rest upon the rails to support the file pockets.

In normal use a large number of such suspension pockets are supported on a pair of rails and are slid back and forth to provide ready access to the contents of the file pockets. As will be apparent on consideration, the movement of the file pockets about in normal use to locate and expose the contents of particular pockets, requires the relative movement of the pockets and supporting rods along the rails. In normal use the forces applied in effecting these movements, partly enhanced by the normal physical variations in the contents of the files, will cause the suspension rods to assume various canted or inclined positions with respect to the supporting rails. This canting is caused by forces which, at least in part, tend to push the supporting rods up and off the rails, permitting them in many cases to drop down at one end or the other below the normal working level. Obviously, this is a time delaying nuisance which it is desirable to avoid.

The structures herein disclosed have been devised to avoid such miscellaneous displacement of the file pockets from the rails while in no way interfering with their removal when it is desired to take a file pocket to some other working space. At the same time the structure herein disclosed is of such a nature as to insure locking of the suspension rods on the rails, either when they are canted at an angle to the rails, or are slid lengthwise in either direction. On any of these movements the suspension rods automatically lock on the rails and prevent their promiscuous displacement.

Generally speaking, the cooperative construction of the rod ends and rails is such as to provide an overhanging head or equivalent on the rails in cross section and notches on the rod ends providing a throat of specific dimensions with respect to the rail heads so as to permit directly vertical removal of the rods from the rails. In other types the functional forms of construction are the same but are reversed in that the rails provide the throat and the rod ends the overhanging heads.

There is illustrated in Figure 1 a form of suspension file supporting frame which is commonly used by placing it in a filing drawer or cabinet. It consists of a supporting frame 10 of any suitable configuration provided with a pair of spaced parallel rails 11 upon which the file pockets are supported for sliding movement. The file pockets take the form of a folded sheet 12 of fibrous material having attached to its free edges the suspension rods 13. In accordance with this invention the rail heads and rod ends are so constructed as to provide the functions and advantages previously disclosed. As suggested previously herein, the rails 11 may be built directly into a file drawer or other filing structure so as to be a part thereof.

As illustrated in Figures 2, 7 and 8, the rails 11 have a transverse configuration to provide enlarged rail heads 15 connected to the main rail body by a region 14 of restricted width. The rods 13 are provided on the edge with notches 16 which intersect the rod edges with a reduced throat 17. The width of the throat 17 is just slightly greater than the transverse width of the rail head 15. The result is that the rods may be lifted vertically from the rails with ease since the rail heads 15 can just nicely pass through the throats 17 without binding. However, as clearly illustrated in Figure 8, if the rods 13 lie at an inclination to the rails 15, the projections forming the throat 17 catch under the rail head and prevent upward displacement of the rods. It will also be clear that any longitudinal shifting of the rods 13 lengthwise in either direction will cause one of the projections forming the throats of the recesses 16 to catch under the rail head and prevent displacement or dismounting of the rods from the rails.

This principle is carried forward in the construction shown in Figure 3, in which the rails 11ª in this case consist of flat strips of suitable material 18 of uniform thickness but having angularly offset portions extending longitudinally thereof to form in effect an enlarged head 18. Specifically in this case the head 18 consists of connected, reversely bent areas which form laterally overhanging ledges with respect to the opposite sides of the rails. The rods 13ª are provided with notches 19 intersecting the rod edges and provided with a throat which is of a width just slightly greater than the overall transverse width of the heads of the rails. To get this effect as shown, the recesses 19 are provided at one side with an inclined defining edge forming a projection 10 which will catch under the overhanging portion at the left side of the rail 11ª. On the other hand, recess 19 at the other side is provided with an angular projection 20 which is positioned to catch under the overhanging terminal edge portion of the railhead, all as clearly shown in Figure 3. The throat of the recess 19 formed by the projections 10 and 20 is just slightly greater than the overall width of the head of the rail 11ª, permitting easy removal of the rods from the rails when desired.

A similar arrangement is provided in the structure of Figure 4, in which case the rod notches are of a configuration quite similar to that of the notches 16 of the structure of Figure 2. In this case the rails 11ᵇ are made of strips of suitable material of uniform thickness which have offset angularly related marginal edge portions to form heads 21 of enlarged transverse dimension with respect to the rail thickness. The suspension rods 13ᵇ are provided with edge intersecting notches 22 shaped to form a throat 23 of a width just slightly greater than the overall transverse width of the rail head 21.

The structures of Figures 5 and 6 have the same function but in effect reverse the rod and rail formations. As in Figure 5, the rails 11ᶜ are in the form of channels having walls of uniform thickness. The free edges of the channels are curved inwardly, as clearly shown, and are disposed in planes of different elevation, providing a throat of predetermined width. The ends of the suspension rods 13ᶜ are formed to provide heads 24 which have a complementary configuration with respect to the curved edges of the channel so as to hook thereunder, depending upon which direction they are displaced lengthwise. It is noted that the overall width of the heads 24 is slightly less than the channel throats, so that these rods can be easily lifted out of the channels when desired. As in previous cases, when the rods are canted or longitudinally shifted with respect to the rails, either both or one or the other of the edges of the rod heads 24 catches under the curved edges of the channel, preventing undesired displacement.

In the structure of Figure 6, the rails 11ᵈ are of channel form, as in the case of Figure 5, but have their free edges laterally displaced inwardly at angles rather than along curved lines to again form a throat of predetermined width. The rods 13ᵈ are provided with shaped heads 25 which cooperate, as in the case of the structure of Figure 5, with the opposed angular edges of the channels to prevent displacement of the rods from the rails while permitting their ready detachment.

A sufficient number of variants of the basic idea of this invention have been disclosed and described herein for the purpose of suggesting somewhat the possible scope of the basic idea of this invention. It is with this thought in mind that applicant proposes to not be limited to the specific examples herein described for illustrative purposes, but only as required by the appended claims.

What is claimed is:

1. In a suspension file the combination comprising a pair of fixed parallel rails and a file folder having a pair of supporting rods each resting at its ends on said rails respectively, said rails and rods having cooperating enlarged heads and recesses with restricted throats, the minimum width of said throats being slightly greater than the maximum widths of said heads, and the spacing between the center lines of said throats being equal to the spacing between the center lines of said heads, whereby the rods may be lifted vertically from the rails at any point therealong to free both ends simultaneously only when the rods lie at right angles to the rails.

2. In the combination of claim 1, said recesses being formed in said rods.

3. In the combination of claim 1, said recesses being formed in said rails.

References Cited in the file of this patent

UNITED STATES PATENTS

| 1,741,157 | Hutchings | Dec. 31, 1929 |
| 1,755,338 | Smiley | Apr. 22, 1930 |

FOREIGN PATENTS

| 177,091 | Great Britain | Mar. 23, 1922 |
| 568,431 | Germany | May 4, 1933 |
| 696,818 | Great Britain | Sept. 9, 1953 |